(12) United States Patent
Honma et al.

(10) Patent No.: US 8,488,939 B2
(45) Date of Patent: Jul. 16, 2013

(54) RECORDING APPARATUS, SOFTWARE UPDATE DATA ACQUISITION METHOD, PROGRAM, AND DATA DELIVERY SYSTEM

(75) Inventors: Tsuyoshi Honma, Chiba (JP); Takashi Kanao, Tokyo (JP); Hiroyuki Chiba, Kanagawa (JP); Hirofumi Kouda, Saitama (JP); Akihiko Kinoshita, Tokyo (JP)

(73) Assignee: Sony Corporation, Tokyo (JP)

( * ) Notice: Subject to any disclaimer, the term of this patent is extended or adjusted under 35 U.S.C. 154(b) by 938 days.

(21) Appl. No.: 12/476,508

(22) Filed: Jun. 2, 2009

(65) Prior Publication Data

US 2010/0011348 A1    Jan. 14, 2010

(30) Foreign Application Priority Data

Jul. 11, 2008  (JP) ................................. 2008-181564

(51) Int. Cl.
*H04N 5/91*  (2006.01)

(52) U.S. Cl.
USPC .......................................................... 386/83

(58) Field of Classification Search
None
See application file for complete search history.

(56) References Cited

U.S. PATENT DOCUMENTS

| | | | | |
|---|---|---|---|---|
| 6,493,748 B1* | 12/2002 | Nakayama et al. | ........... | 709/218 |
| 7,315,977 B2* | 1/2008 | Cox et al. | ..................... | 715/253 |
| 7,480,903 B2* | 1/2009 | Eguchi et al. | ................. | 717/168 |
| 2003/0050050 A1* | 3/2003 | Higuchi et al. | ................. | 455/414 |
| 2010/0306497 A1* | 12/2010 | Farrugia et al. | ............... | 711/202 |

FOREIGN PATENT DOCUMENTS

| | | |
|---|---|---|
| JP | 11-98477 | 4/1999 |
| JP | 2001-34551 | 2/2001 |
| JP | 2003-122579 | 4/2003 |
| JP | 2006-217501 | 8/2006 |

* cited by examiner

*Primary Examiner* — Don Wong
*Assistant Examiner* — Mohammad Kabir
(74) *Attorney, Agent, or Firm* — Oblon, Spivak, McClelland, Maier & Neustadt, L.L.P.

(57) ABSTRACT

A recording apparatus includes a delivery schedule information acquisition section, an update reservation section, and an update data acquisition section. The delivery schedule information acquisition section acquires information on a delivery schedule of update data for updating control software, the update data being delivered from an update delivery server by an IP multicast system. The update reservation section generates, based on the information on the delivery schedule acquired by the delivery schedule information acquisition section, acquisition reservation information of the update data. The update data acquisition section acquires the update data based on the acquisition reservation information generated by the update reservation section.

9 Claims, 16 Drawing Sheets

FIG.11

Update-delivery-timetable-attached EPG screen

| Time | Channel U | Channel A | Channel B | Channel C | Channel D | Channel E |
|---|---|---|---|---|---|---|
| 19:00 | BD ver1.08 | News 1 | Variety show 5 | Anime 8 | Drama 12 | Anime 15 |
| 20:00 | BD ver1.08 | Movie 2 | | Movie 9 | | Variety show 16 |
| 21:00 | BD ver1.08 | Drama 3 | News 6 | Drama 10 | Anime 13 | Anime 17 |
| | | | Drama 7 | | Variety show 14 | |
| 22:00 | BD ver1.08 | News 4 | | News 11 | | News 18 |

RECORDING APPARATUS, SOFTWARE UPDATE DATA ACQUISITION METHOD, PROGRAM, AND DATA DELIVERY SYSTEM

BACKGROUND OF THE INVENTION

1. Field of the Invention

The present invention relates to a recording apparatus for recording program data distributed via a network, a software update data acquisition method, a program, and a data delivery system.

2. Description of the Related Art

Recent years, recording apparatuses capable of recording/reproducing data of programs and contents delivered through various transmission media to/from storage media having a large capacity, such as an HDD (Hard Disk Drive), a DVD (Digital Versatile Disc), and a Blu-ray disc have become common. Delivery systems for programs and contents are diversified, and examples thereof include a delivery system that uses broadcast radio waves as a transmission medium, such as terrestrial analog broadcast, terrestrial digital broadcast, BS broadcast, and CS broadcast, and a delivery system that uses a network as a transmission medium, such as an IP multicast system and a VOD (Video On Demand) system. The IP multicast system is a system in which broadcast programs delivered by multicast from a server, that is a delivery source of programs and contents, via a network are taken in by a recording apparatus to be recorded therein. The VOD system is a system in which, in response to a user's request with respect to the deliver source server made via the network to deliver a content including program data, the content including program data delivered from the server is taken in by a recorder such as a recording apparatus of the user to be stored therein.

Incidentally, in the recording apparatus connectable to a network as described above, software incorporated therein is updated to a latest version (hereinafter, referred to as "update" of software) for adding functions and correcting bugs, for example.

As a method of updating software of a recording apparatus, there are known a method of updating software by a unicast system using a network, a method of updating software using broadcast waves, a method of updating software by distribution of a physical medium such as a DVD (Digital Versatile Disc), and the like. In a case of updating software using a network, a client apparatus including update target software transmits, via the network, an update data acquisition request to a server that provides an update file. In response to the acquisition request, the server delivers update data to the client apparatus by a download method. Using the acquired update file, the recording apparatus updates its own software (see, for example, Japanese Patent Application Laid-open No. 2003-122579).

SUMMARY OF THE INVENTION

However, in the method of updating software by the unicast system using the network, a load on the server that provides the update data is increased along with an increase in the number of client apparatuses. Therefore, there is no guarantee that the software can always be updated as requested when the client apparatus is in an idle state, for example. Sizes of software and update data to be incorporated into the client apparatus are on the increase, resulting in an increasingly large load on the server. As a result, it is becoming more and more difficult to execute an update that is convenient for the client apparatus side.

Although the update method that uses broadcast waves can avoid concentration of the load on the server due to the unicast system, since a band that can be used for the update is limited, the method cannot cope with an increase in size of software and update data.

The update method by the distribution of a physical medium requires a user to be specified for each apparatus and also requires a troublesome procedure of creating and distributing a physical medium, thus resulting in an increase in costs.

In view of the circumstances as described above, there is a need for a recording apparatus, a software update data acquisition method, a program, and a data delivery system that are capable of reducing a load on an update delivery server for delivering update data, and with which the update data can be acquired without temporal variances among a plurality of recording apparatuses.

According to an embodiment of the present invention, there is provided a recording apparatus including a delivery schedule information acquisition section, an update reservation section, and an update data acquisition section. The delivery schedule information acquisition section acquires information on a delivery schedule of update data for updating control software, the update data being delivered from an update delivery server by an IP multicast system. The update reservation section generates, based on the information on the delivery schedule acquired by the delivery schedule information acquisition section, acquisition reservation information of the update data. The update data acquisition section acquires the update data based on the acquisition reservation information generated by the update reservation section.

In the recording apparatus according to the embodiment of the present invention, by delivering the update data for the control software of the recording apparatus by the IP multicast system, the recording apparatus can acquire the update data through an acquisition reservation as in acquiring program data delivered by the IP multicast system through a recording reservation. Accordingly, a load on the update delivery server that delivers the update data can be reduced, and the update data can be acquired without temporal variances among a plurality of recording apparatuses.

The recording apparatus according to the embodiment of the present invention may further include a program information acquisition section, a program selection section, a recording reservation section, and a recording reservation information storage section. The program information acquisition section acquires information on a program delivered from a program delivery server. The program selection section prompts a user to select a program to be set to a recording reservation using the information on a program acquired by the program information acquisition section. The recording reservation section generates recording reservation information of data of the selected program. The recording reservation information storage section stores the recording reservation information generated by the recording reservation section. Further, the update reservation section may generate the acquisition reservation information of the update data based on the information on the delivery schedule acquired by the delivery schedule information acquisition section and the recording reservation information stored in the recording reservation information storage section.

By generating the acquisition reservation information of the update data based on the information on the delivery schedule acquired by the delivery schedule information acquisition section and the recording reservation information stored in the recording reservation information storage section, the update reservation section can generate the acquisition reservation information of the update data while taking into account an overlap of a delivery date/time of the update data with that of the program data set to the recording reservation.

Further, in the recording apparatus according to the embodiment of the present invention, the update data may be delivered repetitively from the update delivery server, and the information on the delivery schedule may contain information on all delivery dates/times of the update data that is delivered repetitively. Furthermore, the update reservation section may generate the acquisition reservation information by determining a delivery date/time of the update data based on the information on the delivery schedule acquired by the delivery schedule information acquisition section and the recording reservation information stored in the recording reservation information storage section.

With such a structure, because the update data is delivered repetitively from the update delivery server and the information on the delivery schedule contains the information on all the delivery dates/times of the update data, a delivery date/time of the update data can be determined while taking into account an overlap of the delivery date/time of the update data with that of the program data that is set to the recording reservation.

Moreover, in the recording apparatus according to the embodiment of the present invention, the update data may be delivered repetitively from the update delivery server, and the information on the delivery schedule may contain information on all delivery dates/times of the update data that is delivered repetitively. Furthermore, the update reservation section may present to the user the information on a program and the information on the delivery schedule of the update data, prompt the user to select one of the delivery dates/times of the update data, and generate the acquisition reservation information using data of the selected one of the delivery dates/times.

With such a structure, by the user him/herself selecting, in a case where there is a program that is not yet set to the recording reservation but is expected to be set to the recording reservation in the future, a delivery date/time of the update data while avoiding the delivery date/time of the program data that is expected to be set to the recording reservation, it is possible to generate acquisition reservation information of update data that takes into account an overlap of a delivery date/time of the update data with that of the program data set to the recording reservation.

According to another embodiment of the present invention, there is provided a software update data acquisition method, including: acquiring information on a delivery schedule of update data for updating control software, the update data being delivered from an update delivery server by an IP multicast system; generating, based on the acquired information on the delivery schedule, acquisition reservation information of the update data; and acquiring the update data based on the generated acquisition reservation information.

According to another embodiment of the present invention, there is provided a medium storing a program to cause a computer to function as a delivery schedule information acquisition section, an update reservation section, and an update data acquisition section. The delivery schedule information acquisition section acquires information on a delivery schedule of update data for updating control software, the update data being delivered from an update delivery server by an IP multicast system. The update reservation section generates, based on the information on the delivery schedule acquired by the delivery schedule information acquisition section, acquisition reservation information of the update data. The update data acquisition section acquires the update data based on the acquisition reservation information generated by the update reservation section.

According to another embodiment of the present invention, there is provided a data delivery system including a recording apparatus and an update delivery server to deliver data of a delivery timetable of update data for updating control software of the recording apparatus, the update delivery server delivering the update data by an IP multicast system. The recording apparatus includes a delivery schedule information acquisition section, an update reservation section, and an update data acquisition section. The delivery schedule information acquisition section acquires information on a delivery schedule of the update data for updating the control software, the update data being delivered from the update delivery server by the IP multicast system. The update reservation section generates, based on the information on the delivery schedule acquired by the delivery schedule information acquisition section, acquisition reservation information of the update data. The update data acquisition section acquires the update data based on the acquisition reservation information generated by the update reservation section.

As described above, according to the embodiments of the present invention, a load on an update delivery server that delivers update data can be reduced, and update data can be acquired without temporal variances among a plurality of recording apparatuses.

These and other objects, features and advantages of the present invention will become more apparent in light of the following detailed description of best mode embodiments thereof, as illustrated in the accompanying drawings.

BRIEF DESCRIPTION OF DRAWINGS

FIG. 11 is a diagram showing an example of an update-delivery-timetable-attached EPG screen;

DESCRIPTION OF PREFERRED EMBODIMENTS

Hereinafter, embodiments of the present invention will be described with reference to the drawings.

Figure 1:
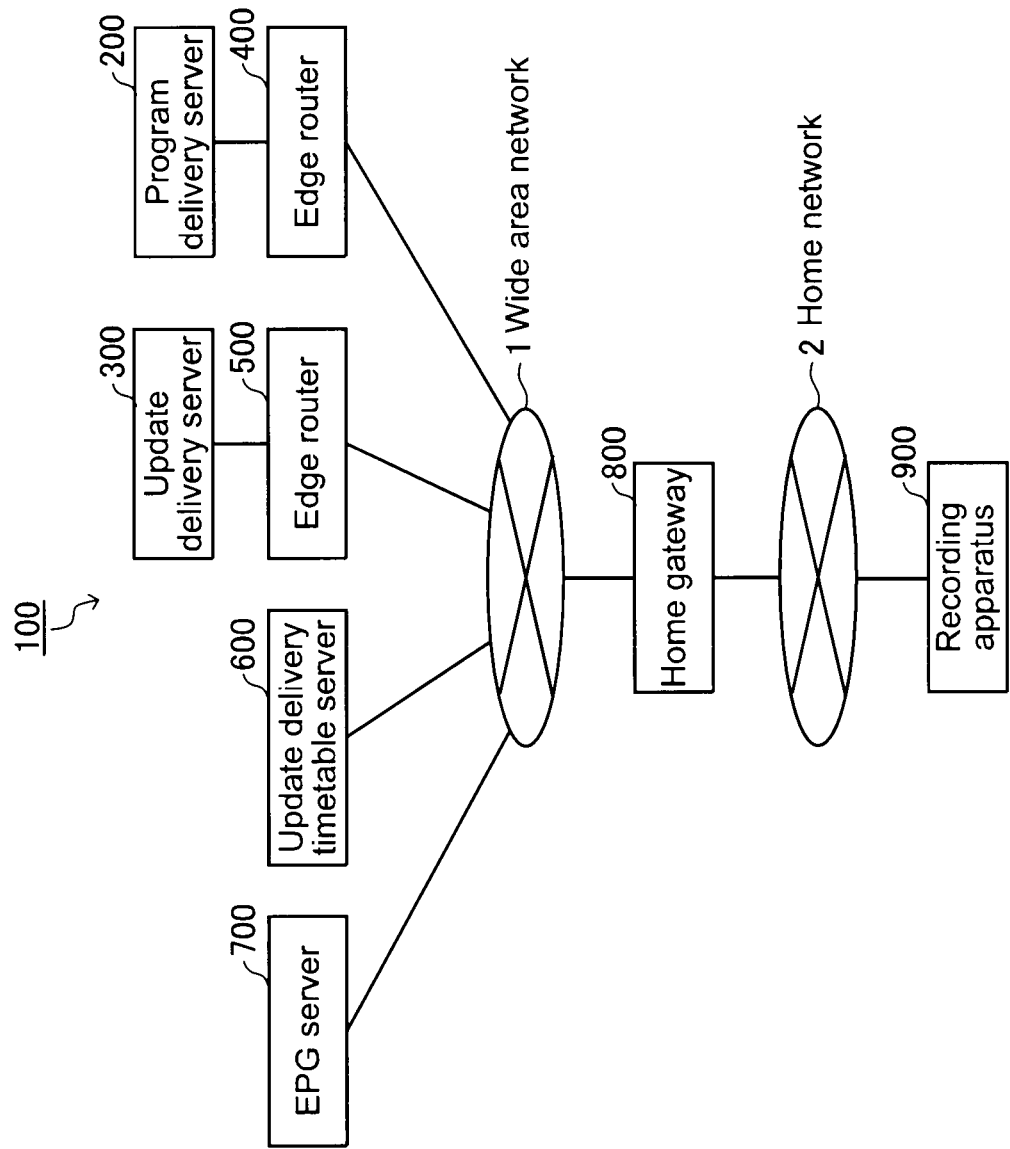
FIG. 1 is a diagram showing a structure of a data delivery system according to an embodiment of the present invention.

FIG. 1 is a diagram showing a structure of a data delivery system according to an embodiment of the present invention.

A data delivery system 100 is a system capable of providing, on a CDN (Contents Delivery Network) or an NGN (Next Generation Network) that is capable of delivering data of programs and contents that include moving images and audio, a service for delivering update data of software incorporated into a household electrical appliance such as a household recording apparatus. The CDN is a network designed to smoothly deliver a large amount of digital contents to a large number of users. The NGN is a next-generation IP network into which an IP network for Internet services and a telephone network for telephone services are integrated as an IP communication network having improved QoS (Quality of Service) and security, using an SIP (Session Initiation Protocol) as a communication protocol.

The data delivery system 100 includes a program delivery server 200, an update delivery server 300, edge routers 400 and 500, an update delivery timetable server 600, an EPG server 700, a home gateway 800, a recording apparatus 900, and the like.

The program delivery server 200 is a server that delivers data of programs as digital contents to a wide area network 1 such as the Internet by an IP multicast system via the edge router 400.

The update delivery server 300 is a server that delivers data for updating software of various types of recording apparatuses 900 (hereinafter, referred to as "update data") to the wide area network 1 by the IP multicast system via the edge router 500.

The edge routers 400 and 500 are routers that each support the IP multicast system.

The update delivery timetable server 600 is a server that provides, by a download method, a service for delivering an update delivery timetable as information on a delivery schedule of update data that is delivered from the update delivery server 300 by the IP multicast system.

The EPG server 700 is a server that delivers EPG (Electronic Program Guide) data as guide information on program data delivered from the program delivery server 200 by the IP multicast system. The EPG data is constituted of, for example, guide information on programs of a plurality of channels. The guide information on programs contains, for example, a program ID, a program name, a delivery date/time, a broadcast channel, and a multicast address.

The home gateway 800 is an apparatus for connecting, to the wide area network 1, a household electrical appliance such as the recording apparatus 900 connectable to a home network 2 as an in-home network.

The recording apparatus 900 is an apparatus that is capable of acquiring data delivered from the program delivery server 200, the update delivery server 300, the update delivery timetable server 600, and the EPG server 700 via the wide area network 1 and the home network 2, recording program data onto a storage medium such as an HDD (Hard Disk Drive), a DVD (Digital Versatile Disc), and a Blu-ray disc, and reading and reproducing the program data recorded onto the storage medium.

It should be noted that although not illustrated in FIG. 1, the data delivery system 100 also includes a server that provides a service for reserving a network band for ensuring a data transmission velocity in user units or content units, for example. Moreover, the recording apparatus 900 may be a computer such as a PC (Personal Computer) installed with a recording function.

Next, a structure of the recording apparatus 900 will be described.

Figure 2:
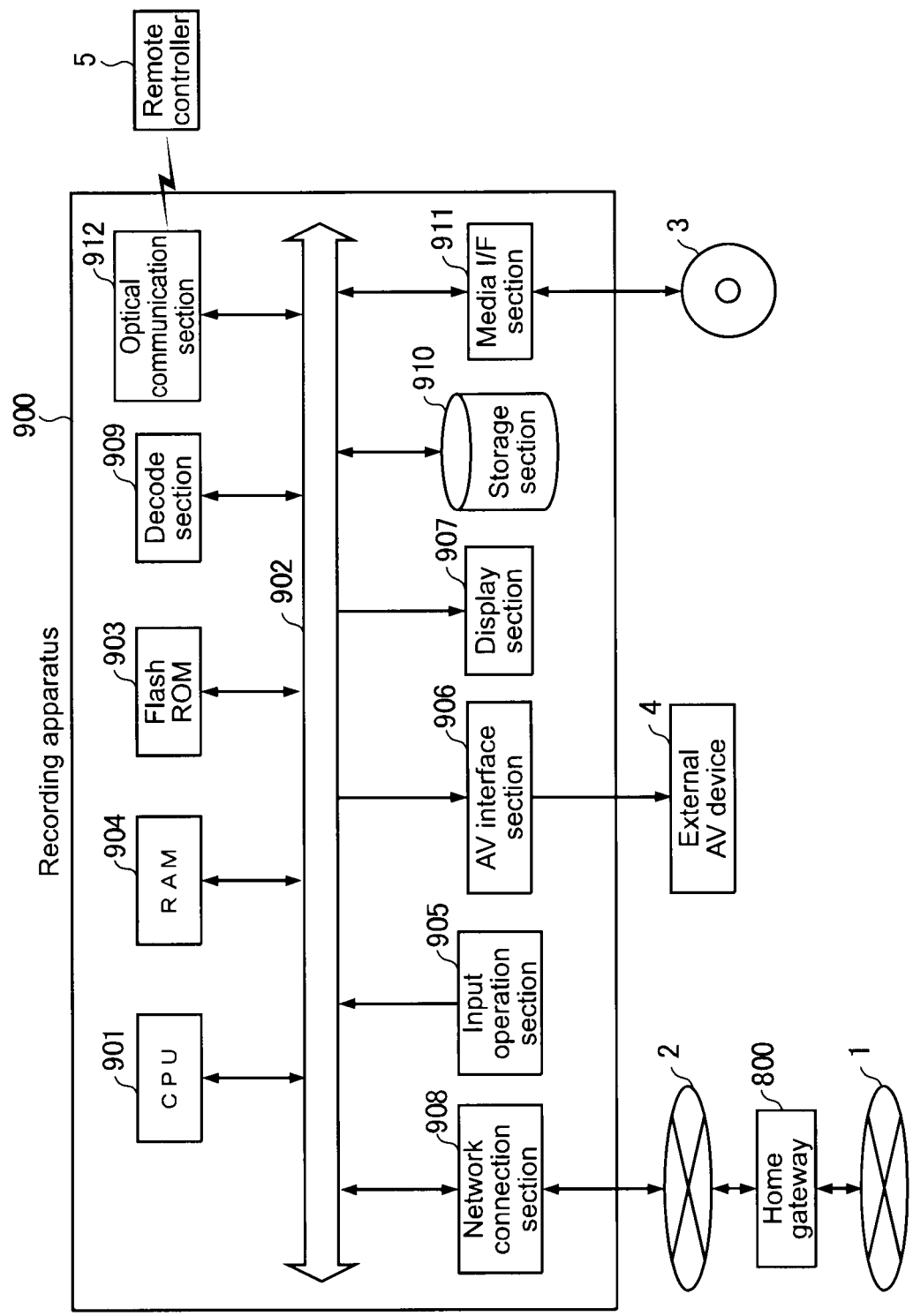
FIG. 2 is a diagram showing a hardware structure of a recording apparatus shown in FIG. 1.

FIG. 2 is a diagram showing a hardware structure of the recording apparatus 900.

As shown in the figure, connected to a CPU 901 through a system bus 902 are a flash ROM 903, a RAM 904, an input operation section 905, an AV interface 906, a display section 907, a network connection section 908, a decode section 909, a storage section 910 constituted of, for example, a hard disk drive (HDD), a media I/F section 911, an optical communication section 912, and the like.

The flash ROM 903 stores software including programs and various types of data processed and executed by the CPU 901. Software stored in the flash ROM 903 can be updated by update data acquired from the update delivery server 300.

The RAM 904 is used as a temporary working area for the CPU 901 and an area for temporarily storing data.

The input operation section 905 includes various keys and processes inputs of commands for various operations from the user. Commands that are input from the input operation section 905 are transmitted to the CPU 901 via the system bus 902.

The optical communication section 912 is an interface through which the recording apparatus 900 communicates with a remote controller 5. The remote controller 5 includes various keys like the input operation section 905, and processes inputs of commands for various operations from the user, and transmits them after converting input signals thereof into optical signals. The optical communication section 912 receives the optical signals transmitted from the remote controller 5, converts the optical signals into electric signals, and outputs the electric signals to the CPU 901 via the system bus 902.

The display section 907 is constituted of a display device such as an LCD (Liquid Crystal Display) and a display control circuit that drives the display device. The display section 907 prompts the user to confirm commands and data that the user has input and displays various statuses, for example.

The network connection section 908 is an interface that processes, for example, a connection with a network including the wide area network 1 such as the Internet and the home network 2.

The AV interface 906 processes inputs and outputs of video signals and audio signals with respect to an external AV device 4 such as a television connected to the recording apparatus 900.

The decode section 909 decodes program data that has been compression-encoded for transmission and recording. Video data, audio data, and the like that have been decoded and restored by the decode section 909 are output to the external AV device 4 such as a television via the AV interface 906.

The storage section 910 is constituted of, for example, an HDD, and is capable of storing a software update delivery timetable acquired from the update delivery timetable server 600, EPG data acquired from the EPG server 700, update data acquired from the update delivery server 300, program data acquired from the program delivery server 200, and the like.

The media I/F section 911 is an interface in which a removable medium 3 such as a DVD (Digital Versatile Disc), a Blu-ray disc, and a flash memory is detachably loaded, and program data can be written to and read out from the removable medium 3 loaded therein, for example.

Next, a functional structure of the recording apparatus 900 will be described.

Figure 3:
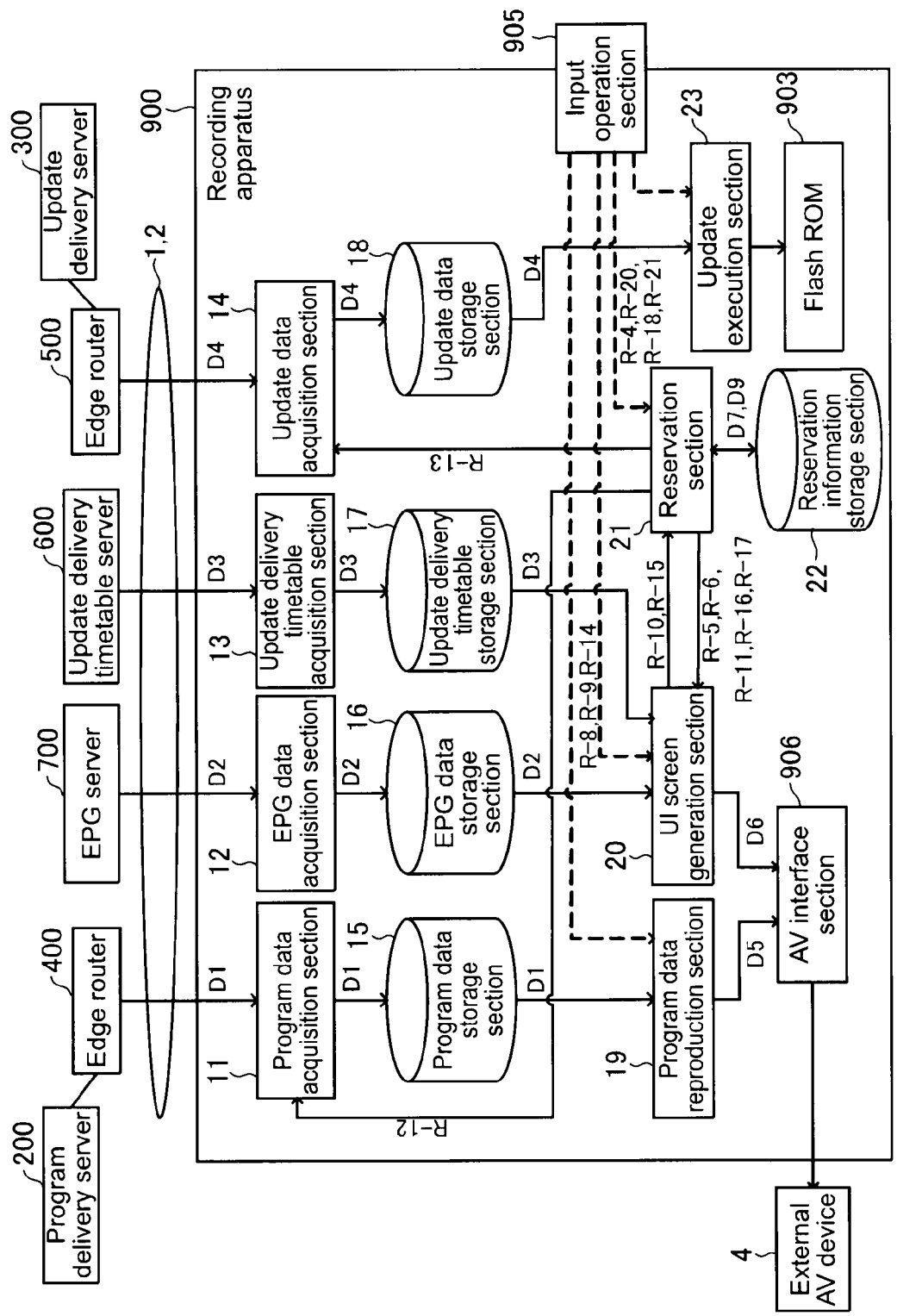
FIG. 3 is a diagram showing a functional structure of the recording apparatus shown in FIG. 1.

FIG. 3 is a diagram showing the functional structure of the recording apparatus 900.

As shown in the figure, the recording apparatus 900 includes a program data acquisition section 11, an EPG data acquisition section 12, an update delivery timetable acquisition section 13, an update data acquisition section 14, a program data storage section 15, an EPG data storage section 16, an update delivery timetable storage section 17, an update data storage section 18, a program data reproduction section 19, a UI screen generation section 20, a reservation section 21, a reservation information storage section 22, and an update execution section 23.

The EPG data acquisition section 12 acquires EPG data D2 delivered from the EPG server 700 by a download method right after the power of the recording apparatus 900 is turned on, periodically, or in response to a request input by the user using the input operation section 905 or the remote controller 5, for example, and stores the data in the EPG data storage section 16.

The EPG data storage section 16 stores the EPG data D2 acquired by the EPG data acquisition section 12.

The program data acquisition section 11 acquires via the wide area network 1 program data D1 delivered from the program delivery server 200 by the IP multicast system using broadcast waves and stores the data in the program data storage section 15.

The program data storage section 15 stores the program data D1 acquired by the program data acquisition section 11.

The update delivery timetable acquisition section 13 acquires an update delivery timetable D3 delivered from the update delivery timetable server 600 by the IP multicast system right after the power of the recording apparatus 900 is turned on, periodically, or in response to a request input by the user using the input operation section 905 or the remote controller 5, for example, and stores the data in the update delivery timetable storage section 17.

The update data acquisition section 14 acquires update data D4 delivered from the update delivery server 300 by the IP multicast system based on acquisition reservation information D9 of the update data registered in the reservation information storage section 22, and stores the data in the update data storage section 18.

The update delivery timetable storage section 17 stores the update delivery timetable D3 acquired by the update delivery timetable acquisition section 13.

The update data storage section 18 stores the update data D4 acquired by the update data acquisition section 14.

The UI screen generation section 20 generates, based on the EPG data D2 stored in the EPG data storage section 16 and the update delivery timetable D3 stored in the update delivery timetable storage section 17, various types of UI (User Interface) screen data D6 such as an update-delivery-timetable-attached EPG screen. The various types of UI screen data D6 generated by the UI screen generation section 20 are output to the external AV device 4 via the AV interface 906 to be presented to the user as visible information.

The program data reproduction section 19 decodes the program data D1 read out from the program data storage section 15 using the decode section 909, and outputs video data and audio data as reproduction data D5 to the external AV device 4 via the AV interface 906.

The reservation section 21 generates recording reservation information D7 for setting a recording reservation for the program data D1 and acquisition reservation information D9 for setting an acquisition reservation for the update data D4, and registers the information in the reservation information storage section 22. Here, the recording reservation information D7 of a program contains a program ID, a program name, a delivery date/time, a broadcast channel, a multicast address, and the like, and the acquisition reservation information D9 of update data contains a compatible model name, version information, a delivery date/time, a broadcast channel, a multicast address, and the like.

The reservation section 21 also monitors whether the delivery dates/times in the recording reservation information D7 and the acquisition reservation information D9 registered in the reservation information storage section 22 have reached a current date/time. When a recording reservation of program data whose delivery date/time has reached the current date/time is detected, a program data acquisition request <R-12> therefor is output to the program data acquisition section 11. On the other hand, when an acquisition reservation of update data whose delivery date/time has reached the current date/time is detected, an update data acquisition request <R-13> therefor is output to the update data acquisition section 14.

The reservation information storage section 22 stores the recording reservation information D7 for a program and the acquisition reservation information D9 for update data generated by the reservation section 21.

It should be noted that the program data storage section 15, the EPG data storage section 16, the update delivery timetable storage section 17, the update data storage section 18, and the reservation information storage section 22 are set to the storage section 910, the removable medium 3 loaded to the media I/F section 911, the flash ROM 903, and the like.

The update execution section 23 updates software stored in the flash ROM 903 based on the update data D4 stored in the update data storage section 18.

Next, a structure of the program delivery server 200, the update delivery server 300, the update delivery timetable server 600, and the EPG server 700 will be described.

Figure 4:
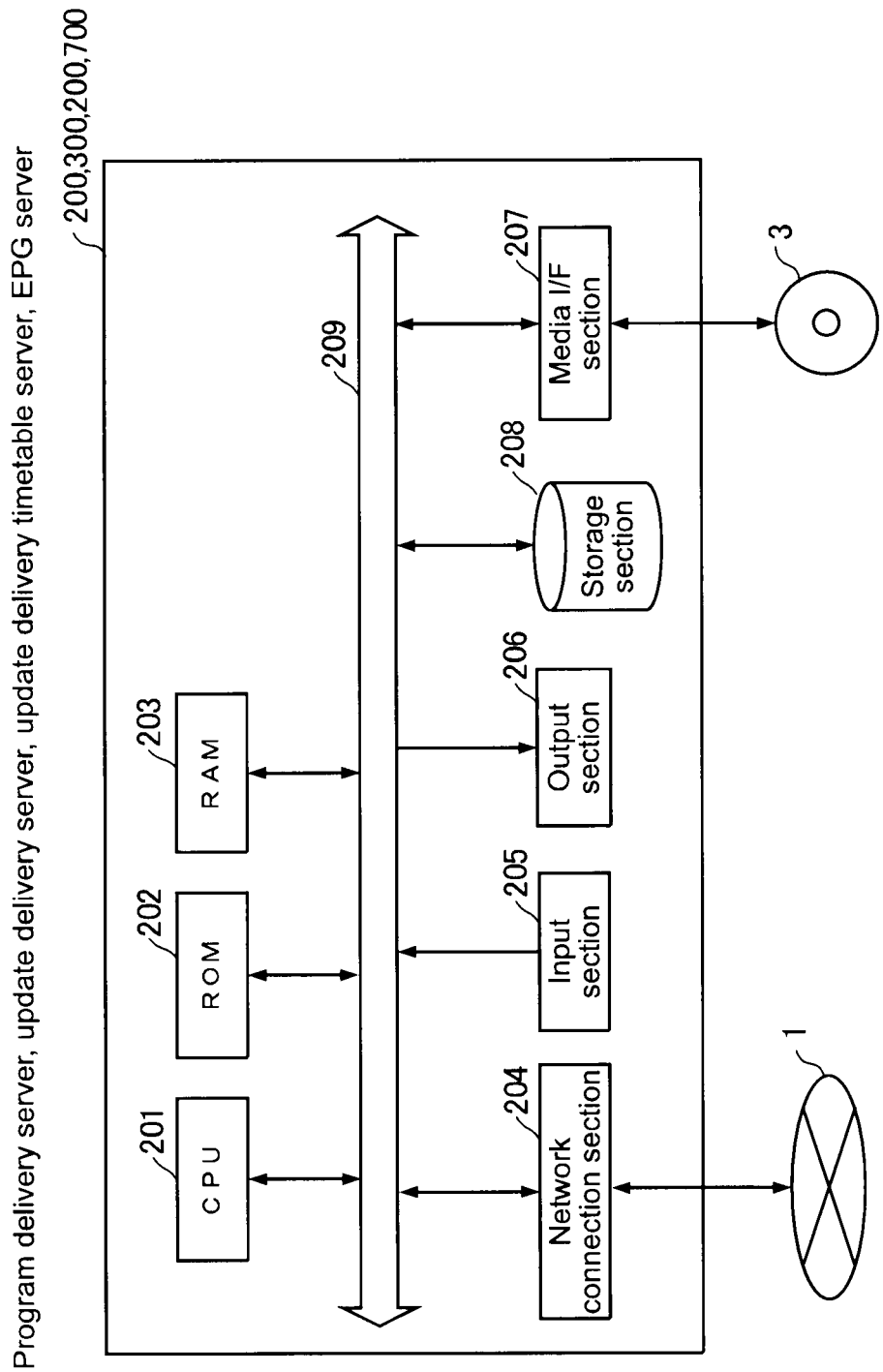
FIG. 4 is a block diagram showing a hardware structure of a program delivery server, an update delivery server, an update delivery timetable server, and an EPG server shown in FIG. 1.

FIG. 4 is a block diagram showing a hardware structure of the program delivery server 200, the update delivery server 300, the update delivery timetable server 600, and the EPG server 700.

As shown in FIG. 4, the program delivery server 200, the update delivery server 300, the update delivery timetable server 600, and the EPG server 700 each have a structure constituted of a computer system of a PC or the like.

Specifically, connected to a CPU 201 via a system bus 209 are a ROM 202, a RAM 203, a network connection section 204, an input section 205 constituted of a keyboard, a mouse, and the like, an output section 206 constituted of a display such as CRT (Cathode Ray Tube) and an LCD (Liquid Crystal Display) and a speaker, a media I/F section 207, and a storage section 208 constituted of a hard disk drive, a nonvolatile memory, and the like.

The network connection section 204 processes a wired or wireless connection with the wide area network 1 such as the Internet. The storage section 208 stores programs and data for causing a computer to execute a function as a specific server. The CPU 201 loads a program to the RAM 203 from the ROM 202 or the storage section 208 and carries out operational processing for interpretive execution. The media I/F section 207 is loaded with the removable medium 3 such as a magnetic disc, an optical disc, and a flash memory as appropriate, and a program read out therefrom is installed in the storage section 208 as necessary.

Next, an operation of updating software of the recording apparatus 900 in the data delivery system 100 will be described.

Figure 5:
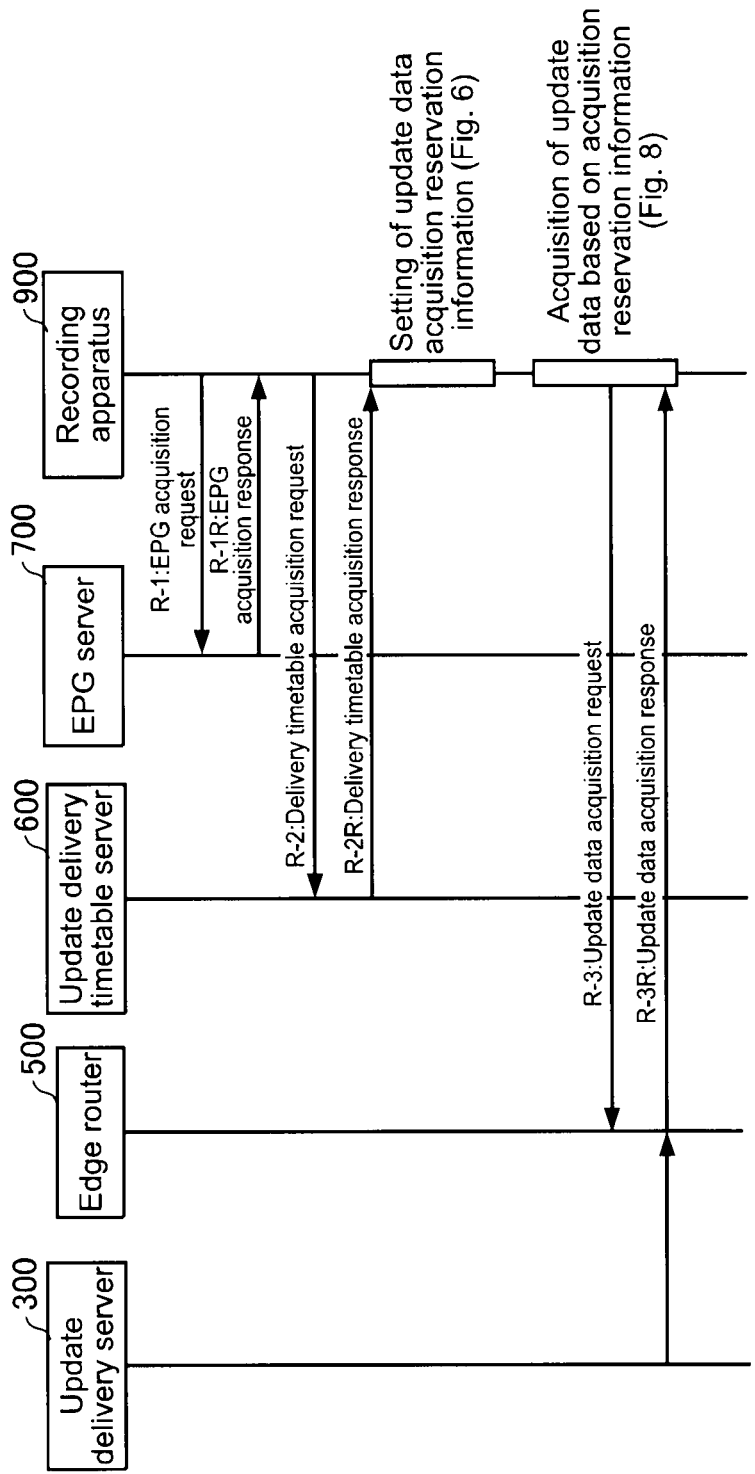
FIG. 5 is a sequence diagram of an entire system up to acquisition of software update data by the recording apparatus.

FIG. 5 is a sequence diagram of an entire system up to acquisition of software update data by the recording apparatus 900. FIGS. 6 to 9 are flowcharts showing operations of the recording apparatus 900.

In the recording apparatus 900, the EPG data acquisition section 12 acquires the EPG data D2 from the EPG server 700 and the update delivery timetable acquisition section 13 acquires the update delivery timetable D3 from the update delivery timetable server 600 right after the power is turned on, periodically, or in response to a request from the user. The sequence of FIG. 5 shows that the update delivery timetable D3 is acquired subsequent to the EPG data D2. However, the present invention is not limited thereto, and the EPG data D2 may be acquired subsequent to the update delivery timetable D3, or the EPG data D2 and the update delivery timetable D3 may be acquired at the same time.

Here, the operation will be described while taking a case where the update delivery timetable D3 is acquired subsequent to the EPG data D2 as an example. It should be noted that when the recording apparatus 900 accesses the wide area network 1, the home gateway 800 relays the connection. However, a description on the relay of the connection by the home gateway 800 will be omitted in descriptions below for brevity of description.

Figure 6:
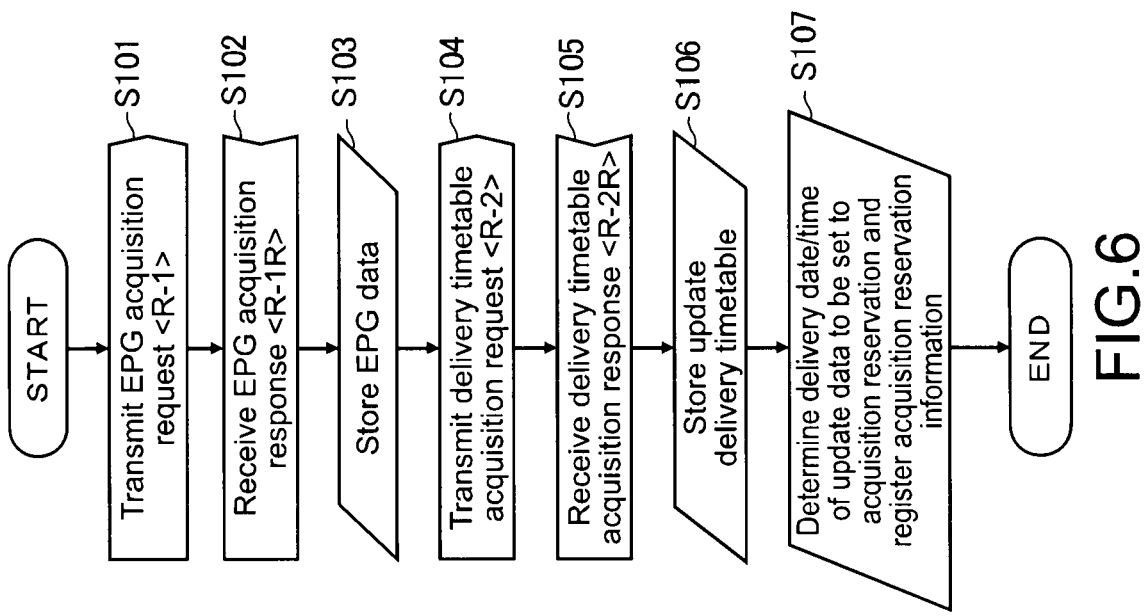
FIG. 6 is a flowchart showing an operation of the recording apparatus from acquisition of EPG data to setting of an acquisition reservation of update data.

In FIG. 5, first, the EPG data acquisition section 12 of the recording apparatus 900 transmits an EPG acquisition request <R-1> to the EPG server 700 via the networks 1 and 2 (FIG. 6: Step S101). Upon receiving the EPG acquisition request <R-1> from the recording apparatus 900, the EPG server 700 reads out latest EPG data D2 stored in its own storage section 208 and delivers an EPG acquisition response <R-1R> containing the EPG data D2 to the recording apparatus 900 via the networks 1 and 2 by the download method. Upon receiving the EPG acquisition response <R-1R> from the EPG server 700 (FIG. 6: Step S102), the recording apparatus 900 stores the EPG data D2 contained in the EPG acquisition response <R-1R> in the EPG data storage section 16 (FIG. 6: Step S103).

Next, the update delivery timetable acquisition section 13 of the recording apparatus 900 transmits a delivery timetable acquisition request <R-2> to the update delivery timetable server 600 via the networks 1 and 2 (Step S104). Upon receiving the delivery timetable acquisition request <R-2> from the recording apparatus 900, the update delivery timetable server 600 reads out the update delivery timetable D3 stored in its own storage section 208 and transmits a delivery timetable acquisition response <R-2R> containing the update delivery timetable D3 to the recording apparatus 900 via the networks 1 and 2 by the download method. Upon receiving the delivery timetable acquisition response <R-2R> from the update delivery timetable server 600 (Step S105), the recording apparatus 900 stores the update delivery timetable D3 contained in the delivery timetable acquisition response <R-2R> in the update delivery timetable storage section 17 (Step S106).

Next, the reservation section 21 determines, based on the update delivery timetable D3 stored in the update delivery timetable storage section 17 and the recording reservation information D7 stored in the reservation information storage section 22, a delivery date/time of update data to be set to the acquisition reservation and generates and registers acquisition reservation information D9 containing information on the delivery date/time in the reservation information storage section 22 (Step S107). Specifically, the operation is carried out as follows.

Figure 7:
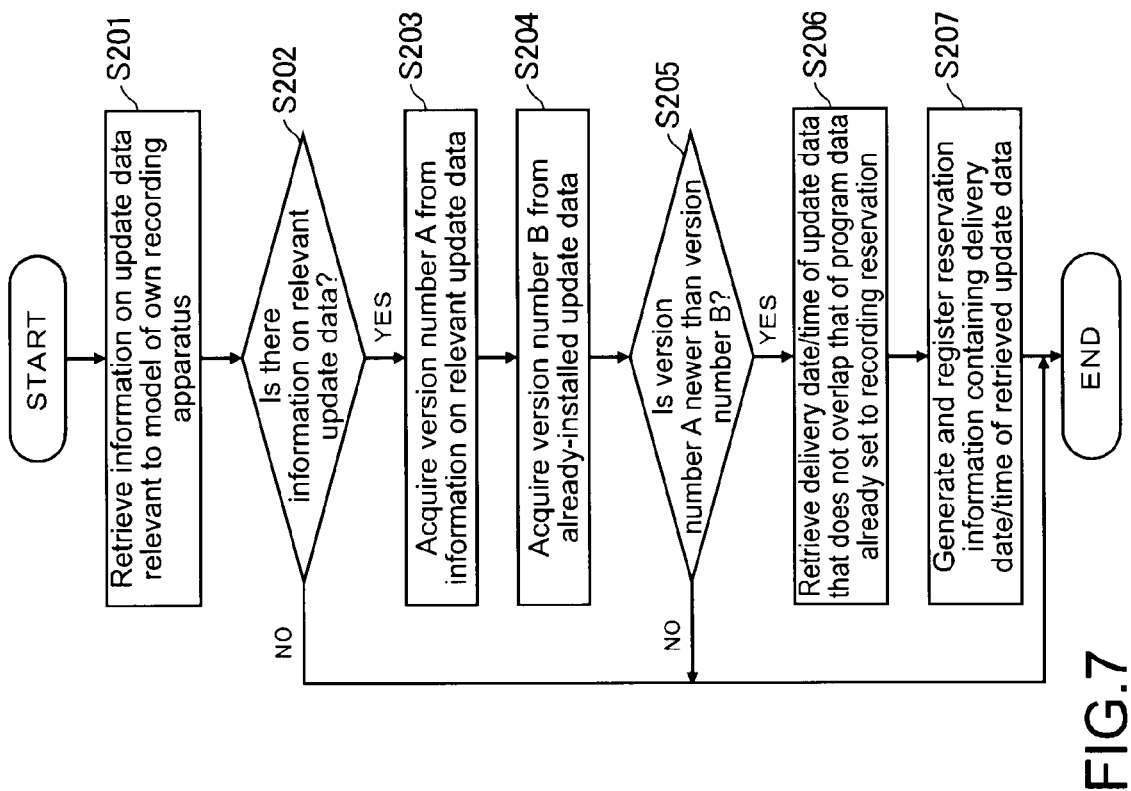
FIG. 7 is a flowchart showing an operation at a time when acquisition reservation information of update data is generated and registered.

FIG. 7 is a flowchart showing an operation at a time when the acquisition reservation information D9 of update data is generated and registered.

The update delivery timetable D3 delivered from the update delivery timetable server 600 contains information on update data that support software of various models, the update data being delivered from the update delivery server 300. The information on the update data is, for example, a software ID for identifying update data, a compatible model name, a version number, a delivery date/time, a broadcast channel, and a multicast address necessary for accessing the update data delivered from the update delivery server 300 by the IP multicast system via the wide area network 1. From the update delivery server 300, a plurality of pieces of update data that support different models are sequentially and periodically delivered by the IP multicast system. For example, pieces of update data that support a single model are delivered from the update delivery server 300 a plurality of times a day at a one- or several-hour cycle, and at set dates/times.

The reservation section 21 retrieves, with the storage of a latest update delivery timetable D3 in the update delivery timetable storage section 17 as a trigger, periodically, or in response to a request from the user, for example, information on update data relevant to the model of the own recording apparatus 900 from the update delivery timetable D3 (FIG. 7: Step S201). When no information on the relevant update data is found as a result of the retrieval (FIG. 7: NO in Step S202), the operation is ended. On the other hand, when information on the relevant update data is found (FIG. 7: YES in Step S202), the reservation section 21 acquires a version number A of the update data (FIG. 7: Step S203). Furthermore, the reservation section 21 acquires a version number B of update data already installed in the recording apparatus 900 (FIG. 7: Step S204).

Next, the reservation section 21 judges whether the version number A of the update data acquired from the update delivery timetable D3 is newer than the version number B of the update data already installed in the recording apparatus 900 (FIG. 7: Step S205). When judging that the version number A is not newer than the version number B (FIG. 7: NO in Step S205), the reservation section 21 assumes that the software installed in the recording apparatus 900 is already updated to the latest version and ends the operation. On the other hand, when judging that the version number A is newer than the version number B (FIG. 7: YES in Step S205), the reservation section 21 retrieves a delivery date/time of the update data that does not overlap that of program data already set to the recording reservation from the update delivery timetable D3 (FIG. 7: Step S206). When a plurality of delivery dates/times of the relevant update data are retrieved, one retrieval result is adopted according to a predetermined rule. An example of the rule is adopting a delivery date/time that is closest to the current date/time.

It should be noted that the expression "does not overlap" above means that there is no overlapping time period. For brevity of description, the number of channels that the recording apparatus 900 can receive at the same is one. When the recording apparatus 900 can receive a plurality of (N) channels at the same time, N overlaps are judged as "does not overlap" above.

Next, the reservation section 21 generates and stores the acquisition reservation information D9 of the update data in the reservation information storage section 22 using the information on the delivery date/time of the adopted update data and the information on the update data extracted from the update delivery timetable D3 (FIG. 7: Step S207). Here, the acquisition reservation information D9 of the update data contains, for example, a software ID, a delivery date/time, and a multicast address.

If a delivery date/time of update data that does not overlap that of program data already set to the recording reservation cannot be retrieved from the update delivery timetable D3, the reservation section 21 generates an error message to that effect, and outputs the error message to the external AV device 4 via the AV interface 906 to thus present it to the user.

The acquisition reservation information D9 of the update data stored in the reservation information storage section 22 can be checked by the user as appropriate via the external AV device 4. In other words, upon being input with an update reservation confirmation request <R-4> from the user using the input operation section 905 or the remote controller 5, the reservation section 21 retrieves the acquisition reservation information D9 of the update data from the reservation information storage section 22 and outputs an update reservation list display request <R-5> containing the retrieval result to the UI screen generation section 20. Upon receiving the update reservation list display request <R-5>, the UI screen generation section 20 generates UI screen data D6 of an update reservation list based on the acquisition reservation information D9 of the update data contained in the update reservation list display request <R-5>, and outputs the data to the external AV device 4 via the AV interface 906.

Figure 10:
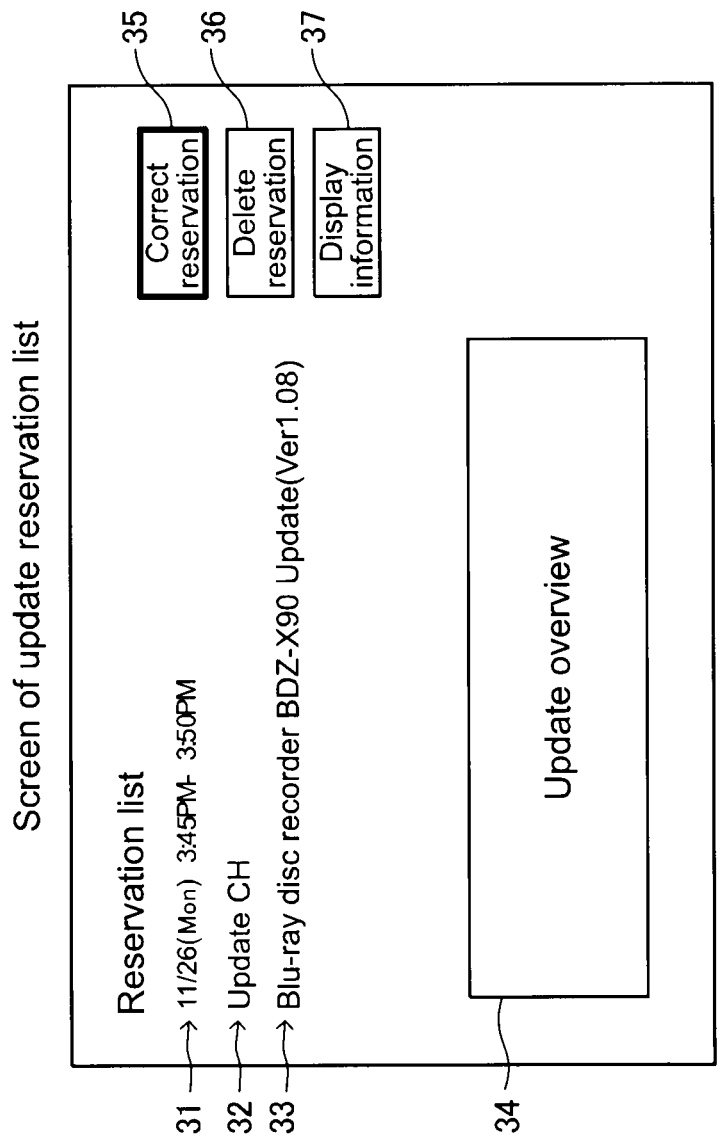
FIG. 10 is a diagram showing an example of a display screen of an update reservation list.

FIG. 10 is a diagram showing an example of a display screen of the update reservation list. As shown in the figure, the display screen of the update reservation list displays an update data delivery date/time 31, a channel 32, a model name and update version number 33, an update overview 34 (including update content of software update), and the like. In addition, the display screen of the update reservation list is provided with a reservation correction button 35, a reservation deletion button 36, an information display button 37, and the like.

The reservation correction button 35 is a button for correcting the delivery date/time contained in the acquisition reservation information D9 of the update data. The reservation deletion button 36 is a button for deleting the registered acquisition reservation information D9 of the update data. The information display button 37 is a button for displaying other information regarding the update.

Next, an operation carried out in a case where the reservation correction button 35 is pressed by the user on the display screen of the update reservation list will be described.

When the reservation correction button 35 is pressed by the user on the display screen of the update reservation list shown in FIG. 10 using the input operation section 905 or the remote controller 5, a reservation correction request <R-20> is output to the reservation section 21. Upon being input with the reservation correction request <R-20>, the reservation section 21 outputs an EPG display request <R-6> to the UI screen generation section 20. Upon being input with the EPG display request <R-6> from the reservation section 21, the UI screen generation section 20 generates UI screen data D6 of an update-delivery-timetable-attached EPG screen to which the EPG data D2 stored in the EPG data storage section 16 and the update delivery timetable D3 stored in the update delivery timetable storage section 17 are integrated, and outputs the data to the external AV device 4 via the AV interface 906.

FIG. 11 is a diagram showing an example of an update-delivery-timetable-attached EPG screen. The update-delivery-timetable-attached EPG screen is constituted of an area 41 for each program and an area 42 for each delivery date/time of update data. A time is allocated to one axial direction on the screen, and the areas 41 and 42 are disposed at positions on the time axis respectively corresponding to the delivery dates/times. By referencing the update-delivery-timetable-attached EPG screen, the user can find a delivery date/time of update data that does not overlap that of program data already set to the recording reservation, for example.

In the update-delivery-timetable-attached EPG screen, when an area 42 of any of the delivery dates/times of the update data is selected by the user using the input operation section 905 or the remote controller 5, the UI screen generation section 20 generates data of an update data acquisition reservation screen as the UI screen data D6 and outputs the data to the external AV device 4 via the AV interface 906. Accordingly, the update data acquisition reservation screen is displayed on the external AV device 4.

Figure 12:
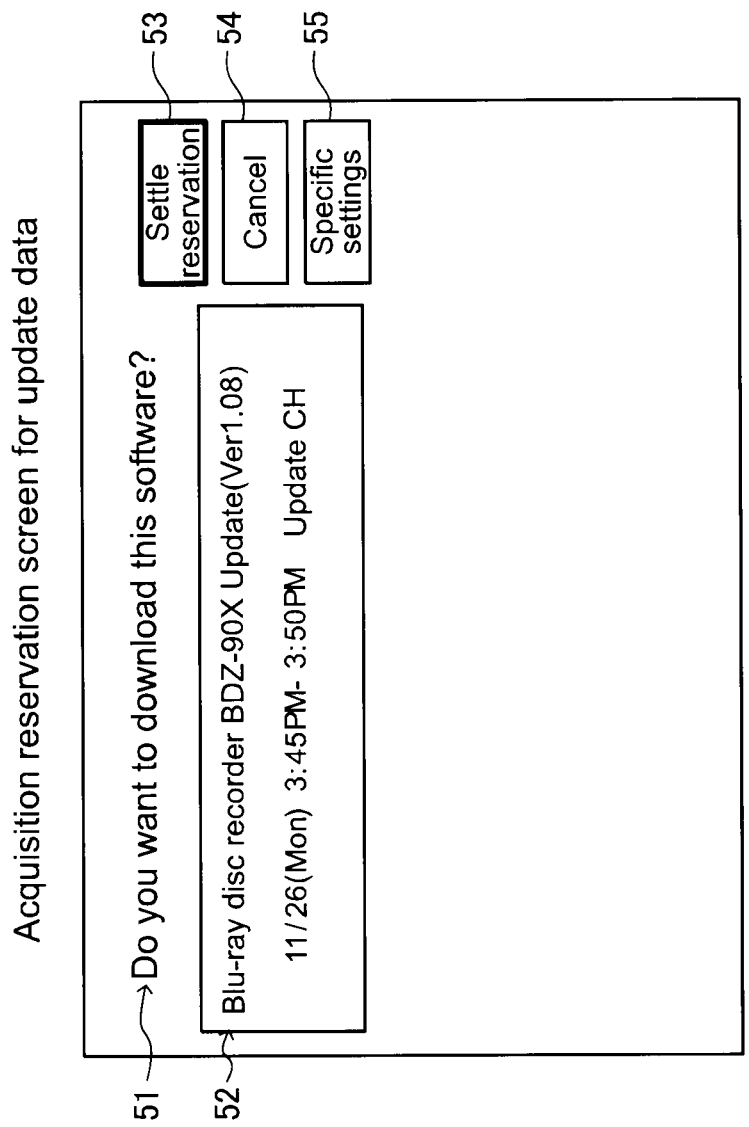
FIG. 12 is a diagram showing an example of an acquisition reservation screen for update data.

FIG. 12 is a diagram showing an example of the update data acquisition reservation screen. On the update data acquisition reservation screen, a sentence 51 asking whether an acquisition reservation for update data is to be set, information 52 on update data (e.g., compatible model name, version number, delivery date/time, broadcast channel, and multicast address), and the like are displayed. A reservation settlement button 53, a cancel button 54, a specific setting button 55, and the like are also provided on the update data acquisition reservation screen. When the reservation settlement button 53 is pressed by the user using the input operation section 905 or the remote controller 5, the reservation section 21 deletes acquisition reservation information D9 of update data already registered in the reservation information storage section 22, and generates and registers acquisition reservation information D9 of update data newly selected by the user on the update-delivery-timetable-attached EPG screen shown in FIG. 11 in the reservation information storage section 22. Accordingly, a correction of the update reservation is completed.

Moreover, when the cancel button 54 is pressed by the user on the update data acquisition reservation screen shown in FIG. 12, the reservation section 21 cancels the correction processing of the acquisition reservation information D9 of the update data. Accordingly, the screen returns to the display screen of the update reservation list shown in FIG. 10, for example. Furthermore, when the specific setting button 55 is pressed by the user on the update data acquisition reservation screen shown in FIG. 12, a screen for specific settings is displayed, and settings thereof can thus be carried out.

Next, an operation carried out in a case where the recording apparatus 900 acquires the update data based on the acquisition reservation information D9 registered in the reservation information storage section 22 will be described.

Figure 8:
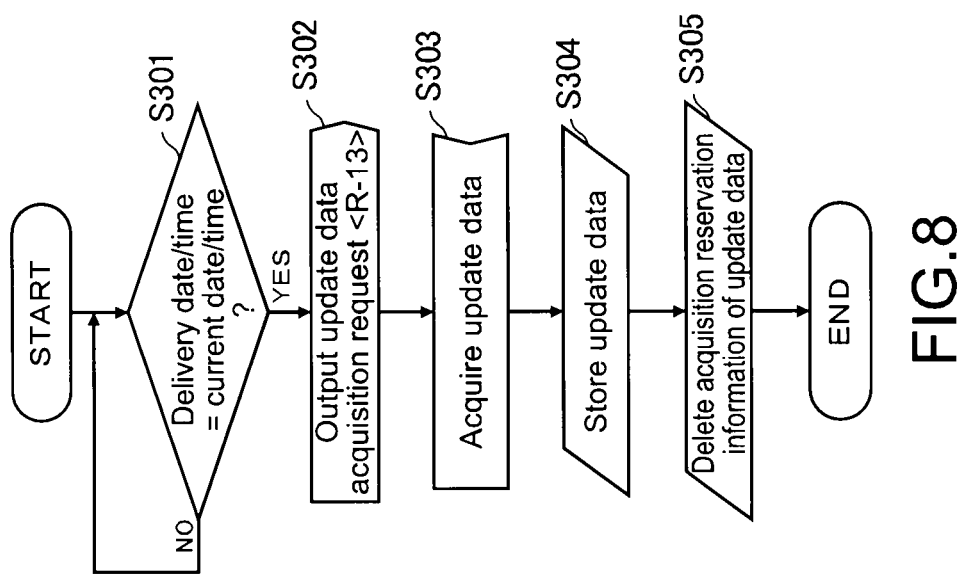
FIG. 8 is a flowchart showing an operation carried out in a case where the update data is acquired based on the acquisition reservation information.

FIG. 8 is a flowchart showing the operation carried out in the case where the update data is acquired based on the acquisition reservation information D9.

When the delivery date/time in the acquisition reservation information D9 stored in the reservation information storage section 22 is checked and the delivery date/time is judged to match the current date/time (YES in Step S301), the reservation section 21 extracts information such as the software ID and the multicast address from the acquisition reservation information D9 and outputs an update data acquisition request <R-13> containing the information to the update data acquisition section 14 (Step S302). Upon being input with the update data acquisition request <R-13>, the update data acquisition section 14 acquires, based on the information such as the software ID and the multicast address contained in the update data acquisition request <R-13>, the update data D4 delivered from the update delivery server 300 by the IP multicast system (Step S303), and stores the data in the update data storage section 18 (Step S304). After that, the update data acquisition section 14 outputs an acquisition completion notification to the reservation section 21. Upon being input with the acquisition completion notification, the reservation section 21 deletes the already-used acquisition reservation information D9 from the reservation information storage section 22 (Step S305).

It should be noted that here, the description has been given on the operation carried out in the case where the update data D4 is acquired based on the acquisition reservation information D9. However, the same operation is applicable to a case where program data D1 is acquired based on recording reservation information D7. Specifically, when acquiring the program data D1, upon checking a delivery date/time in the recording reservation information D7 stored in the reservation information storage section 22 and judging that the delivery date/time matches the current date/time, the reservation section 21 extracts information such as the program ID, the broadcast channel, and the multicast address from the recording reservation information D7 and transmits a program data acquisition request <R-12> containing the information to the program data acquisition section 11. Upon receiving the program acquisition request <R-12>, the program data acquisition section 11 acquires, based on the information such as the program ID, the broadcast channel, and the multicast address contained in the program data acquisition request <R-12>, program data D1 delivered from the program delivery server 200 via the wide area network 1 by the IP multicast system, and stores the data in the program data storage section 15. After that, the program data acquisition section 11 outputs an acquisition completion notification to the reservation section 21. Upon being input with the acquisition completion notification, the reservation section 21 deletes the already-used recording reservation information D7 from the reservation information storage section 22.

After the update data D4 is stored in the update data storage section 18 as described above, the update execution section 23 executes update processing of software stored in the flash ROM 903 using the update data stored in the update data storage section 18, right after the power of the recording apparatus 900 is turned on or in response to a request from the user, for example.

Next, an operation carried out in a case where a recording reservation of program data is to be newly set when the acquisition reservation information D9 is stored in the reservation information storage section 22 will be described.

Figure 9:
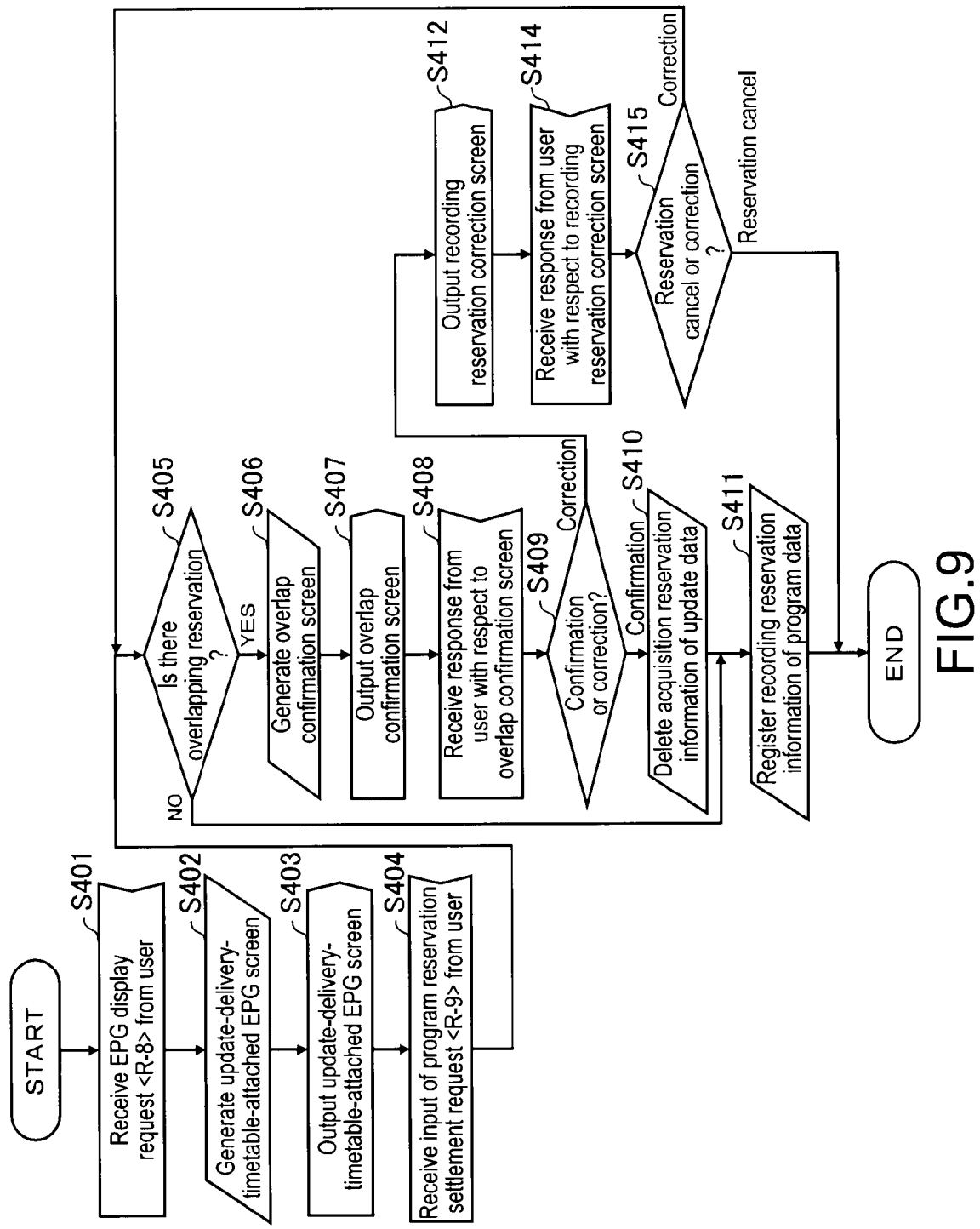
FIG. 9 is a flowchart showing an operation carried out in a case where a recording reservation of program data is to be newly set when acquisition reservation information is stored in a reservation information storage section.

FIG. 9 is a flowchart regarding this case. First, an EPG display request <R-8> is input to the UI screen generation section 20 by the user using the input operation section 905 or the remote controller 5 (Step S401). Upon being input with the EPG display request <R-8>, the UI screen generation section 20 generates UI screen data D6 of update-delivery-timetable-attached EPG screen shown in FIG. 11, for example, based on the EPG data D2 stored in the EPG data storage section 16 and the update delivery timetable D3 stored in the update delivery timetable storage section 17 (Step S402). The UI screen data D6 of the update-delivery-timetable-attached EPG screen generated by the UI screen generation section 20 is output to the external AV device 4 via the AV interface 906 to be presented to the user (Step S403). It should be noted that here, the update-delivery-timetable-attached EPG screen as shown in FIG. 11 has been displayed. However, it is also possible to display only the EPG without displaying the update delivery timetable.

When an area 41 of a program to be set to the recording reservation is selected by the user using the input operation section 905 or the remote controller 5 on the update-delivery-timetable-attached EPG screen shown in FIG. 11, the UI screen generation section 20 generates data of a recording reservation screen for the selected program data as the UI screen data D6 and outputs the data to the external AV device 4 via the AV interface 906. Accordingly, the recording reservation screen for the program data is displayed on the external AV device 4.

Figure 13:
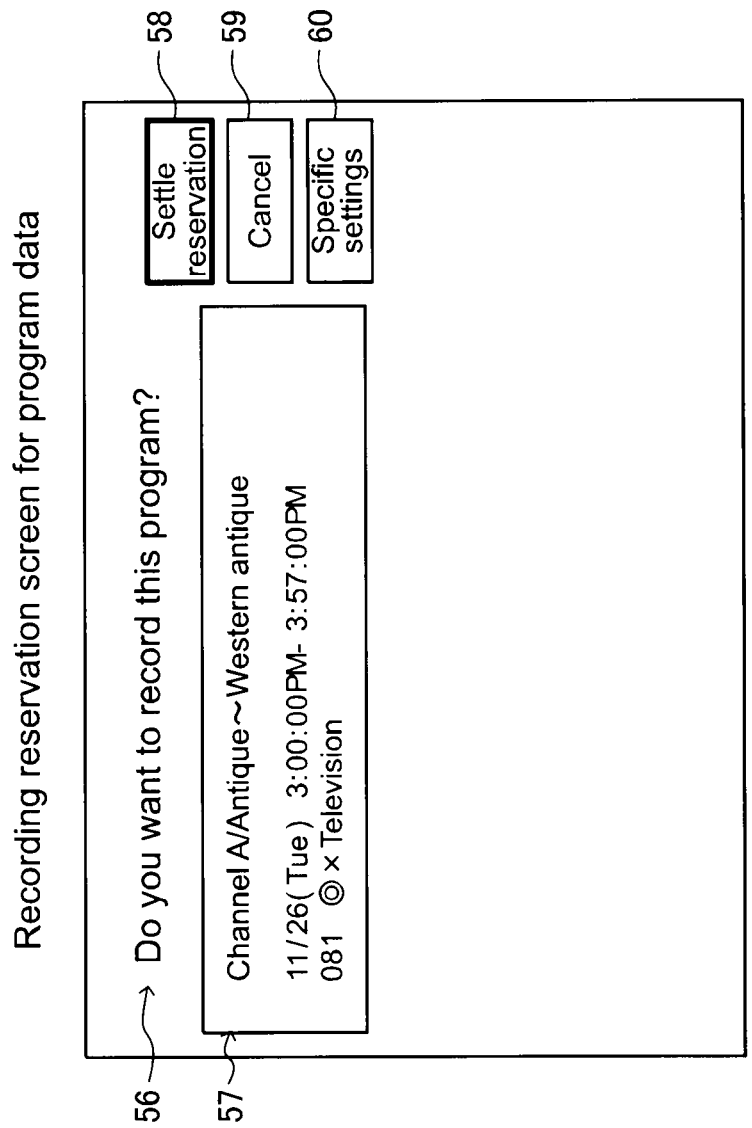
FIG. 13 is a diagram showing an example of a recording reservation screen for program data.

FIG. 13 is a diagram showing an example of the recording reservation screen for program data. On the recording reservation screen for program data, a sentence 56 asking whether a recording reservation of program data is to be set, information 57 on program data (e.g., program name, channel, delivery date/time, and broadcast channel), and the like are displayed. A reservation settlement button 58, a cancel button 59, a specific setting button 60, and the like are also provided on the recording reservation screen for program data. When the reservation settlement button 58 is pressed by the user using the input operation section 905 or the remote controller 5, a program reservation settlement request <R-9> is input to the UI screen generation section 20 (Step S404). Upon being input with the program reservation settlement request <R-9>, the UI screen generation section 20 reads out information such as the program ID, the delivery date/time, the broadcast channel, and the multicast address of the program selected on the update-delivery-timetable-attached EPG screen shown in FIG. 11 from the EPG data D2 stored in the EPG data storage section 16, and outputs a program recording reservation request <R-10> containing the information to the reservation section 21.

Upon being input with the program recording reservation request <R-10> from the UI screen generation section 20, the reservation section 21 judges whether there is a reservation of other program data or update data whose delivery date/time matches that of program data to be newly set to the recording reservation (Step S405). Here, the term "overlap" means that the delivery dates/times overlap even partially. It should be noted that for brevity of description, the number of channels that the recording apparatus 900 can receive at the same time by the IP network system is one. When the recording apparatus 900 can receive a plurality of (N) channels at the same time by the IP network system, the "overlap" is judged when the number of overlaps exceeds N.

When judged that there is no overlapping reservation for program data or update data as a result of the judgment (NO in Step S405), the reservation section 21 generates and registers recording reservation information D7 of new program data in the reservation information storage section 22 (Step S411). When judged that there is an overlapping reservation for program data or update data (YES in Step S405), the reservation section 21 outputs an overlap confirmation screen display request <R-11> to the UI screen generation section 20. Upon being input with the overlap confirmation screen display request <R-11>, the UI screen generation section 20 generates data of an overlap confirmation screen as the UI screen data D6 (Step S406) and outputs the data to the external AV device 4 via the AV interface 906 to thus present it to the user (Step S407).

Hereinafter, a description will be given on a case where overlapping data that is already set to the reservation is update data. It should be noted that the same operation is applicable to a case where overlapping data that is already set to the reservation is program data.

Figure 14:
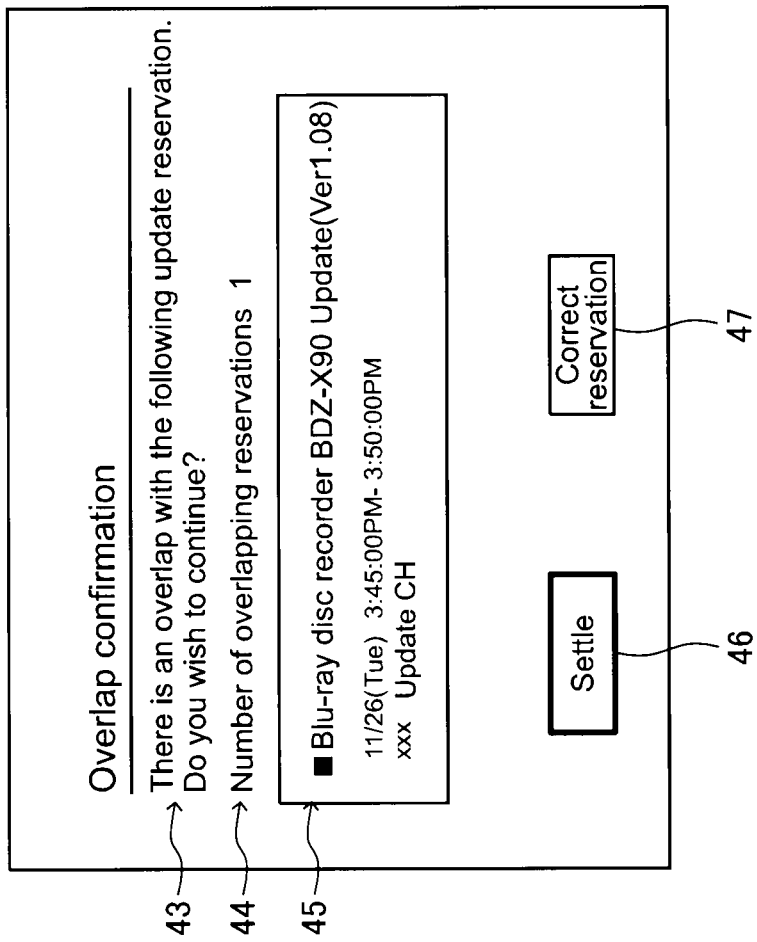
FIG. 14 is a diagram showing an example of an overlap confirmation screen in a case where there is a reservation of update data whose delivery date/time overlaps that of program data to be newly set to the recording reservation.

FIG. 14 is a diagram showing an example of the overlap confirmation screen in a case where there is a reservation for update data whose delivery date/time overlaps that of program data to be newly set to the recording reservation. On the overlap confirmation screen, a sentence 43 asking whether a recording reservation of program data is to be newly set in priority over overlapping data already set to the reservation (update data in this example), an overlapping reservation count 44 with respect to the program data to be newly set to the recording reservation, information 45 on the overlapping data already set to the reservation, and the like are displayed. A confirmation button 46, a reservation correction button 47, and the like are also provided on the overlap confirmation screen. When the confirmation button 46 is pressed by the user using the input operation section 905 or the remote controller 5 on the overlap confirmation screen, the reservation section 21 receives "confirm" as a response from the user with respect to the overlap confirmation screen (Steps S408 and S409). Upon receiving the response "confirm", the reservation section 21 deletes acquisition reservation information D9 of the overlapping update data from the reservation information storage section 22 (Step S410) and registers recording reservation information D7 of the new program data in the reservation information storage section 22 (Step S411).

Further, when the reservation correction button 47 is pressed by the user using the input operation section 905 or the remote controller 5 on the overlap confirmation screen shown in FIG. 14, the reservation section 21 receives "correct" as a response from the user with respect to the overlap confirmation screen (Steps S408 and S409). Upon receiving the response "correct", the reservation section 21 outputs a correction screen display request <R-17> for allowing the user to correct a content of the new recording reservation of the program data to the UI screen generation section 20. Upon receiving the correction screen display request <R-17>, the UI screen generation section 20 generates data of a recording reservation correction screen as the UI screen data D6 and outputs the data to the external AV device 4 via the AV interface 906.

The user cancels the new recording reservation of the program data or corrects a recording time thereof on the recording reservation correction screen, for example, and outputs a program reservation settlement request <R-21> containing the correction result to the reservation section 21. When judging that the correction result contained in the input program reservation settlement request <R-21> is a cancel of the new recording reservation of program data, the reservation section 21 ends the processing for the new recording reservation of the program data. Moreover, when the correction result is a correction of a recording time of the recording reservation of the program data, the reservation section 21 judges again in Step S405, based on the corrected information, whether there is a reservation for other program data or update data whose delivery date/time overlaps that of the program data to be newly set to the recording reservation, and similarly repeats the operation thereafter.

As described above, according to the data delivery system 100 of this embodiment, by delivering the update data D4 of control software of the recording apparatus 900 by the IP multicast system, the recording apparatus 900 can acquire the update data D4 through the acquisition reservation as in acquiring program data D1 delivered by the IP multicast system through the recording reservation. Accordingly, it becomes possible to reduce a load on the update delivery server 300 that delivers the update data D4 and easily cope with an increase in an update data size. Moreover, because the plurality of recording apparatuses can acquire the update data at the same time, a deviation in timings of software update among the recording apparatuses hardly occurs.

Further, in the recording apparatus 900 of this embodiment, the setting of the acquisition reservation information D9 for update data, acquisition of update data based on the acquisition reservation information D9, and even update of software using the update data are executed automatically without requiring instructions from the user. Therefore, time and effort for the user to update software can be remarkably reduced.

Furthermore, in the recording apparatus 900 of this embodiment, the same update data D4 is periodically and repetitively delivered from the update delivery server 300 by the IP multicast system. Therefore, when a delivery date/time of the update data D4 already set to the acquisition reservation overlaps that of the program data D1 to be newly set to the recording reservation, it is of no problem to cancel the acquisition reservation of the update data D4 so that the new recording reservation of the program data D1 becomes effective.

Second Embodiment

Next, a second embodiment of the present invention will be described.

In the first embodiment, the acquisition reservation of update data has been automatically set so that the delivery date/time thereof does not overlap that of program data set to the recording reservation. However, in a case where there is program data that is not yet actually set to the recording reservation but is expected to be set to the recording reservation in the future, if the user him/herself can select a delivery date/time of update data and set acquisition reservation information while avoiding a delivery date/time of program data that is thus expected to be set to the recording reservation, a frequency of the overlap confirmation screen shown in FIG. 14 being displayed or the update data acquisition reservation information being re-set can be suppressed, and a frequency of the user inputting a response with respect to the overlap confirmation screen can also be reduced.

Figure 15:
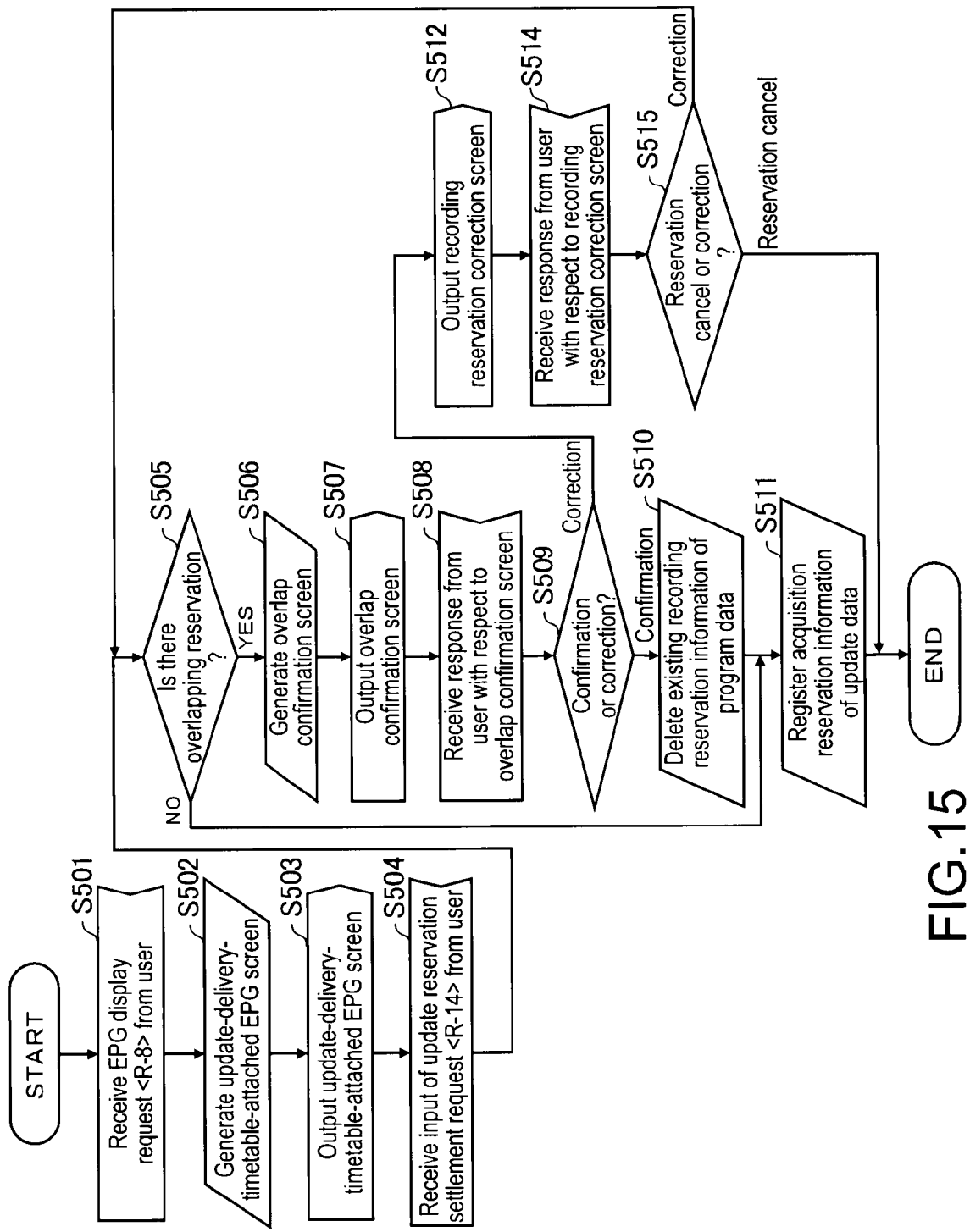
FIG. 15 is a flowchart showing an operation carried out in a case where, in a recording apparatus according to a second embodiment of the present invention, a user him/herself selects a delivery date/time of update data and sets acquisition reservation information.

FIG. 15 is a flowchart showing an operation carried out in a case where the user him/herself selects a delivery date/time of update data and sets acquisition reservation information.

The operation up to acquiring and storing the EPG data D2 and the update delivery timetable D3 is the same as that of the first embodiment. In this regard, a description will start from an operation from after the storage of the EPG data D2 and the update delivery timetable D3.

First, an EPG display request <R-8> is input to the UI screen generation section 20 from the user using the input operation section 905 or the remote controller 5 (Step S501). Upon being input with the EPG display request <R-8>, the UI screen generation section 20 generates UI screen data D6 of an update-delivery-timetable-attached EPG screen shown in FIG. 11, for example, based on the EPG data D2 stored in the EPG data storage section 16 and the update delivery timetable D3 stored in the update delivery timetable storage section 17 (Step S502). The UI screen data D6 of the update-delivery-timetable-attached EPG screen generated by the UI screen generation section 20 is output to the external AV device 4 via the AV interface 906 to thus be presented to the user (Step S503).

Next, on the update-delivery-timetable-attached EPG screen, an area 42 of update data at a delivery date/time on/at which the acquisition reservation is wished to be set is selected by the user using the input operation section 905 or the remote controller 5. The UI screen generation section 20 generates, as the UI screen data D6, data of an acquisition reservation screen for the update data of the selected delivery date/time, and outputs the data to the external AV device 4 via the AV interface 906. Accordingly, the acquisition reservation screen for the update data as shown in FIG. 12 is displayed on the external AV device 4, for example.

When the reservation settlement button 53 on the acquisition reservation screen for the update data is pressed by the user using the input operation section 905 or the remote controller 5, an update reservation settlement request <R-14> is input to the UI screen generation section 20 (Step S504). Upon being input with the update reservation settlement request <R-14>, the UI screen generation section 20 extracts information on the update data (e.g., software ID, version number, delivery date/time, broadcast channel, and multicast address) selected on the update-delivery-timetable-attached EPG screen shown in FIG. 11 from the update delivery timetable D3 stored in the update delivery timetable storage section 17, and outputs an update acquisition reservation request <R-15> containing the information to the reservation section 21.

Upon being input with the update acquisition reservation request <R-15> from the UI screen generation section 20, the reservation section 21 judges whether there is a recording reservation of program data whose delivery date/time overlaps that of the update data to be newly set to the acquisition reservation (Step S505). Here, the term "overlap" means that the delivery dates/times overlap even partially. It should be noted that for brevity of description, the number of channels that the recording apparatus 900 can receive at the same time by the IP network system is one. When the recording apparatus 900 can receive a plurality of (N) channels at the same time by the IP network system, the "overlap" is judged when the number of overlaps exceeds N.

When judged that there is no overlapping reservation for program data as a result of the judgment (NO in Step S505), the reservation section 21 generates and registers acquisition reservation information D9 of the update data in the reservation information storage section 22 (Step S511). When judged that there is an overlapping reservation for program data (YES in Step S505), the reservation section 21 outputs an overlap confirmation screen display request <R-16> to the UI screen generation section 20. Upon being input with the overlap confirmation screen display request <R-16>, the UI screen generation section 20 generates data of an overlap confirmation screen as the UI screen data D6 (Step S506) and outputs the data to the external AV device 4 via the AV interface 906 to thus present it to the user (Step S507).

Figure 16:
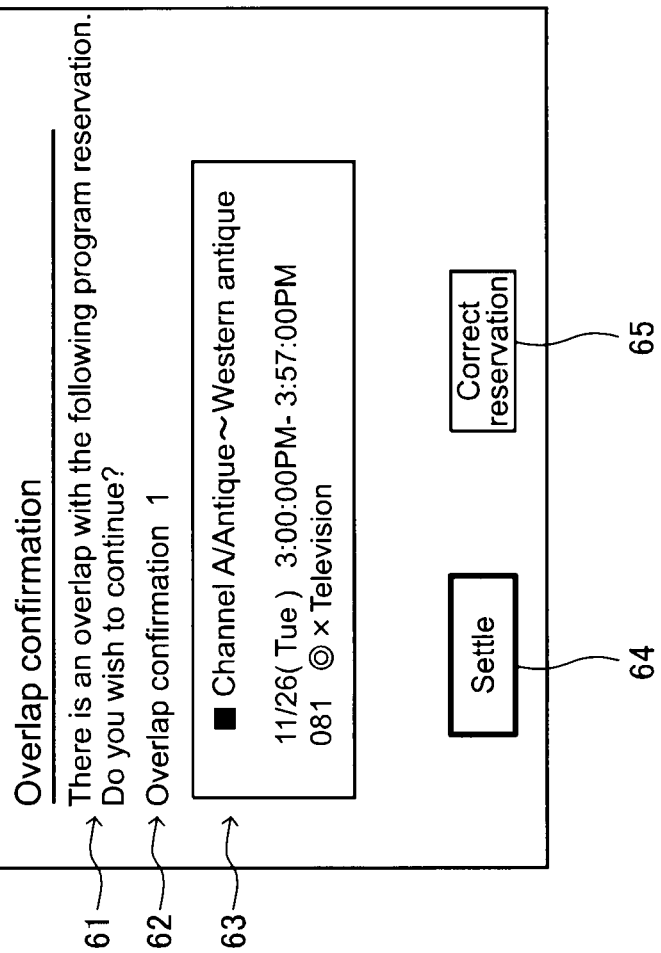
FIG. 16 is a diagram showing an example of an overlap confirmation screen in a case where there is a reservation of program data whose delivery date/time overlaps that of update data to be newly set to an acquisition reservation.

FIG. 16 is a diagram showing an example of the overlap confirmation screen in a case where there is a reservation for program data whose delivery date/time overlaps that of update data to be newly set to the acquisition reservation. On the overlap confirmation screen, a sentence 61 asking whether an acquisition reservation of update data is to be set in priority over overlapping program data already set to the recording reservation, a reservation count 62 indicating the number of reservations for program data overlapping the update data, information 63 on the overlapping program data already set to the recording reservation, and the like are displayed. A confirmation button 64, a reservation correction button 65, and the like are also provided on the overlap confirmation screen. When the confirmation button 64 is pressed by the user using the input operation section 905 or the remote controller 5 on the overlap confirmation screen, the reservation section 21 receives "confirm" as a response from the user with respect to the overlap confirmation screen (Steps S508 and S509). Upon receiving the response "confirm", the reservation section 21 deletes the recording reservation information D7 of the overlapping program data from the reservation information storage section 22 (Step S510) and registers new acquisition reservation information D9 of the update data in the reservation information storage section 22 (Step S511).

Moreover, when the reservation correction button 65 is pressed by the user using the input operation section 905 or the remote controller 5 on the overlap confirmation screen shown in FIG. 16, the reservation section 21 receives "correct" as a response from the user with respect to the overlap confirmation screen (Step S508 and S509). Upon receiving the response "correct", the reservation section 21 outputs to the UI screen generation section 20 a correction screen display request <R-17> for prompting the user to correct the new acquisition reservation for the update data. Upon receiving the correction screen display request <R-17>, the UI screen generation section 20 generates data of an acquisition reservation correction screen as the UI screen data D6 and outputs the data to the external AV device 4 via the AV interface 906.

On the acquisition reservation correction screen, the user cancels the new acquisition reservation for the update data or corrects a delivery date/time thereof and outputs an update data reservation settlement request <R-18> containing a result of the correction to the reservation section 21. When judging that the result of the correction contained in the input update data reservation settlement request <R-18> is cancel, the reservation section 21 ends the processing for the new acquisition reservation for the update data. In addition, when the result of the correction is the correction of the delivery date/time of the acquisition reservation of the update data, the reservation section 21 judges again in Step 505, based on the corrected information, whether there is another reservation for program data whose delivery date/time overlaps that of the update data to be newly set to the acquisition reservation, and similarly repeats the operation thereafter.

Furthermore, the functional structure implemented in the recording apparatus 900 of this embodiment can be structured as a program such as an application program for operating a computer. The program can be distributed by being stored in a computer-readable storage medium.

The present application contains subject matter related to that disclosed in Japanese Priority Patent Application JP 2008-181564 filed in the Japan Patent Office on Jul. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A recording apparatus, comprising:
  a processor including
    a delivery schedule information acquisition section to acquire information on a delivery time schedule of update data used to update a control software of the recording apparatus from a delivery time schedule server, the update data being delivered from an update delivery server by an IP multicast system;

an update reservation section to generate, based on the information on the delivery time schedule acquired by the delivery schedule information acquisition section, acquisition reservation information of the update data; and an update data acquisition section to acquire the update data based on the acquisition reservation information generated by the update reservation section.

2. The recording apparatus according to claim 1, further comprising:

a program information acquisition section to acquire information on a program delivered from a program delivery server;

a program selection section to prompt a user to select a program to be set to a recording reservation using the information on a program acquired by the program information acquisition section;

a recording reservation section to generate recording reservation information of data of the selected program; and a recording reservation information storage section to store the recording reservation information generated by the recording reservation section, wherein the update reservation section generates the acquisition reservation information of the update data based on the information on the delivery time schedule acquired by the delivery schedule information acquisition section and the recording reservation information stored in the recording reservation information storage section.

3. The recording apparatus according to claim 2, wherein the update data is delivered repetitively from the update delivery server, and the information on the delivery time schedule contains information on all delivery dates/times of the update data that is delivered repetitively, and wherein the update reservation section generates the acquisition reservation information by determining a delivery date/time of the update data based on the information on the delivery schedule acquired by the delivery schedule information acquisition section and the recording reservation information stored in the recording reservation information storage section.

4. The recording apparatus according to claim 2, wherein the update data is delivered repetitively from the update delivery server, and the information on the delivery time schedule contains information on all delivery dates/times of the update data that is delivered repetitively, and wherein the update reservation section presents to the user the information on a program and the information on the delivery schedule of the update data, prompts the user to select one of the delivery dates/times of the update data, and generates the acquisition reservation information using data of the selected one of the delivery dates/times.

5. A method of acquiring a software update, comprising:

acquiring, in a processor, information on a delivery time schedule of update data for updating a control software of a recording apparatus from a delivery time schedule server, the update data being delivered from an update delivery server by an IP multicast system;

generating, in the processor and based on the acquired information on the delivery time schedule, acquisition reservation information of the update data; and acquiring, by the processor, the update data based on the generated acquisition reservation information.

6. A non-transitory computer-readable medium storing computer-readable instructions thereon that when executed by a computer cause the computer to perform a method comprising:

acquiring information on a delivery time schedule of update data for updating a control software of a recording device from a delivery time schedule server, the update data being delivered from an update delivery server by an IP multicast system;

an update reservation section to generate, based on the information on the delivery time schedule acquired by the delivery schedule information acquisition section, acquisition reservation information of the update data; and an update data acquisition section to acquire the update data based on the acquisition reservation information generated by the update reservation section.

7. A data delivery system, comprising:

a recording apparatus connected to a network;

a delivery time schedule server connected to the network and configured to provide a delivery time schedule;

an update delivery server connected to the network and configured to deliver data of a delivery timetable of update data used to update control software of the recording apparatus, the update delivery server delivering the update data by an IP multicast system, the recording apparatus including a processor including a delivery schedule information acquisition section to acquire information on a delivery time schedule of the update data used to update the control software from a delivery time schedule, the update data being delivered from the update delivery server by the IP multicast system, an update reservation section to generate, based on the information on the delivery time schedule acquired by the delivery schedule information acquisition section, acquisition reservation information of the update data, and an update data acquisition section to acquire the update data based on the acquisition reservation information generated by the update reservation section.

8. The data delivery system of claim 7, wherein the network is a Contents Delivery Network (CDN).

9. The data delivery system of claim 7, wherein the network is a Next Generation Network (NGN).

* * * * *